United States Patent [19]

Meynier et al.

[11] Patent Number: 4,606,439

[45] Date of Patent: Aug. 19, 1986

[54] DISC BRAKE

[75] Inventors: Guy Meynier, Aulnay-sous-Bois; Jean-Paul Sauvee, Aubervilliers, both of France

[73] Assignee: Societe Anonyme D.B.A., Paris, France

[21] Appl. No.: 754,367

[22] Filed: Jul. 11, 1985

[30] Foreign Application Priority Data

Jul. 20, 1984 [FR] France .................................. 84 11587

[51] Int. Cl.⁴ ............................................. F16D 69/04
[52] U.S. Cl. ................................ 188/73.32; 188/73.31
[58] Field of Search ..................... 188/59, 72.32, 72.33, 188/72.34, 73.31, 73.44, 73.45

[56] References Cited

U.S. PATENT DOCUMENTS 3,525,420  8/1970  Honick et al. ................ 188/73.32 X
3,602,328  8/1971  Fannin .................................. 188/72.5
4,529,067  7/1985  Scott ............................ 188/73.34 X

FOREIGN PATENT DOCUMENTS 2306371  4/1975  France .
2309758  4/1975  France .
2398930  7/1977  France .
24332/71 7/1971  Japan .............................. 188/73.34

Primary Examiner—Duane A. Reger
Attorney, Agent, or Firm—Larry J. Palguta; Ken C. Decker

[57] ABSTRACT

The disc brake incorporates a sliding caliper (18) straddling a rotating disc, the caliper incorporating a first portion (24) sliding on a fixed support (10) by way of at least one axial pillar (20) and incorporating a second portion (28) of the caliper astride the disc. The second portion (28) is hinged to the first portion (24) along an axis of articulation (D) parallel to the plane of the disc and situated radially nearer to the axis of rotation (B) of the disc than the line of action (C—C) of the brake actuator, an abutment (56-58) is positioned between the first (24) and the second (28) portions and lies in a plane perpendicular to the plane of the disc and parallel to the axis of articulation (D).

10 Claims, 6 Drawing Figures

DISC BRAKE

The subject of the invention is a disc brake, particularly for a motor vehicle.

The invention concerns more especially a disc brake of the type incorporating a sliding caliper straddling a rotating disc to be braked, the caliper incorporating a first portion sliding on a fixed support by means of at least one axial pillar, this first portion incorporating a brake actuator which is capable of acting directly upon a first friction component and, by reaction through the sliding caliper, of acting indirectly upon a second friction component by means of a second portion of the caliper which is astride the disc.

A brake of this type is described in French Pat. No. 79-29,852 filed under the No. 2,470,899. The Patent describes a disc brake of the above type whose caliper is mounted on a pillar, and the rotation of the said caliper is prevented during operation of the brake by means of a locking device. This type of brake gives full satisfaction when its component parts, and in particular the caliper, are of relatively light weight. In fact, in order to change the friction components, it is necessary to pivot the caliper about the single pillar, which is easily carried out except when the weight of this caliper becomes large and pivoting may be difficult, or indeed even dangerous, during this pivoting operation. In particular, when a brake of this type is used on heavy vehicles, the weight of the caliper becomes considerable and the ease of replacement of the friction components is impaired by the precautions which have to be taken and by the forces involved when the caliper must be pivoted about its single pillar. In addition, as is known to a person versed in the art, under the effect of the thrust of the brake actuator, the caliper bends, that is to say that its U-shaped portion which straddles the disc tends to open, the two end arms of the U tend to separate from one another. This well known characteristic results in unequal distribution of the pressure on the outer friction component, the greater force being situated in the region of the periphery of the disc, which results in slanting radial wear on the outer friction component. Moreover, the longer the length of the arch of the caliper, that is to say the portion passing over the periphery of the disc, the more these phenomena are amplified.

The subject of the invention is a disc brake of the type described above in which the caliper is disengaged from the disc without difficulty nor risk, however great the weight of this caliper, and the distribution of the pressures on the outer friction component is considerably improved limiting the slanting radial wear.

For this purpose, the invention proposes a disc brake of the type mentioned above, in which the caliper incorporates two portions which are hinged relative to one another along an axis of articulation, which is parallel to the plane of the disc, and which are situated radially nearer to the axis of rotation of the disc than the line of action of the brake actuator, an abutment being positioned between the first and second portions, this abutment lying in a plane which is perpendicular to the plane of the disc and parallel to the axis of articulation.

With this arrangement, only the portion straddling the disc must be tilted in order to disengage the disc, the position of the axis of articulation being such that the greater the forces developed by the brake actuator, the more the portion of the caliper straddling the disc is pushed in rotation about the axis of articulation in the radial direction towards the axis of rotation of the disc, this movement essentially compensating the bending of the caliper due to the thrust force of the actuator. The abutment is intended to limit this tilting around the axis of articulation for the largest forces.

Forming another aim of the invention, the axis of articulation is essentially vertical when the brake is in the operating position, the tilting of the portion of the caliper straddling the disc then being carried out without effort in the same manner as opening a door.

Two embodiments of the invention are described below by way of limiting example, with reference to the accompanying drawings, in which.

Figure 1:
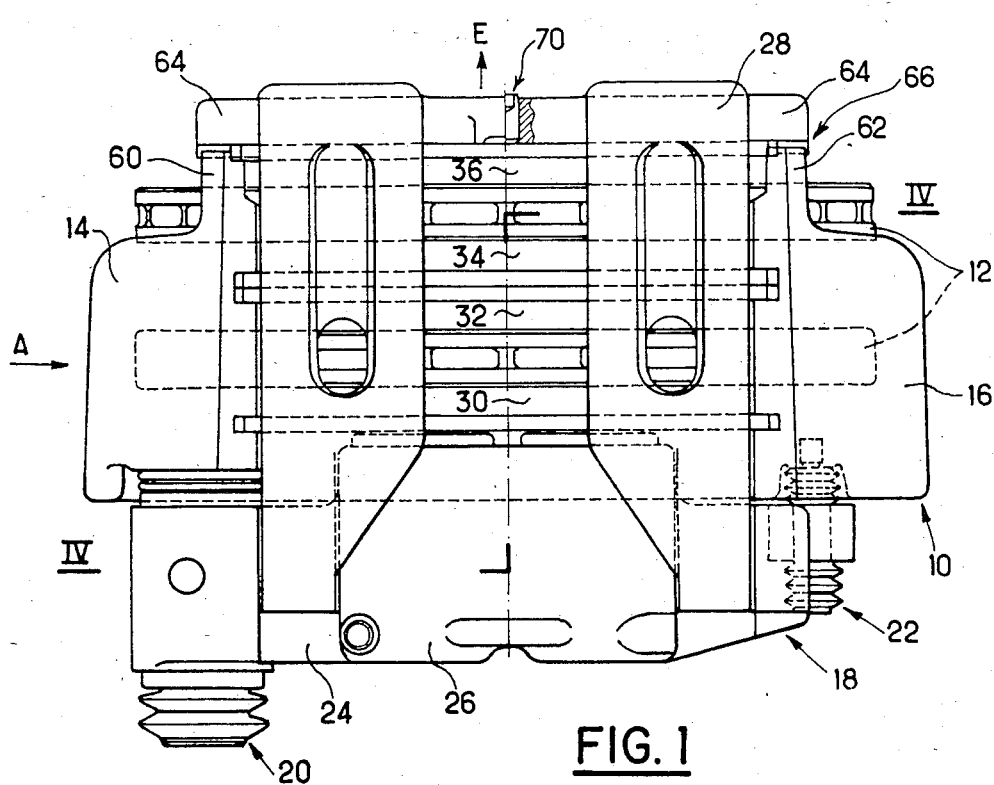
FIG. 1 is a plan view of a brake constructed in accordance with the invention.

The disc brake shown in FIGS. 1 to 4 incorporates a fixed support 10 intended to be joined to a fixed portion of the vehicle (not shown) and consisting, in the embodiment shown, of a plate positioned in the vicinity of a disc 12 intended to be joined in rotation to a wheel of the vehicle (not shown). In this embodiment the disc 12 is of the twin type and is formed by two discs sliding relative to one another by any suitable means well-known to a person versed in the art. The fixed support 10 incorporates two arms 14 and 16 straddling the disc 12. The fixed support 10 carries a caliper so as to be capable of sliding, designated in its entirety by the reference 18, by means of two axial pillars 20 and 22. These pillars are constructed in a conventional manner, that is to say a threaded shaft fixed to the support 10 and passing through bores formed in the caliper 18. As is shown more clearly in FIG. 1, the pillar 20 provides the guidance for the caliper 18, whereas the pillar 22 is intended to prevent the rotation of the caliper 18 about the pillar 20. The caliper 18 is formed by a first portion 24 incorporating a brake actuator designated in its entirety by the reference 26, the brake actuator consisting in a conventional manner of a piston which is capable of sliding in a bore under the effect of hydraulic pressure generated by a source of pressure such as, for example, a master cylinder. This brake actuator 26 will not be described in greater detail; it should be noted, however, that in the embodiment shown the brake actuator is of the twin type and incorporates two pistons and two parallel bores. This first portion 24 of the caliper 18 incorporates the bores for the sliding of the pillars 20 and 22. The caliper 18 incorporates a second portion 28 which is astride the disc 12. The fixed support 10 carries, so as to be anchored and to slide by means of its arms 14 and 16, three friction components, the first 30 positioned between the brake actuator 26 and a first disc, and two other friction components 32 and 34 positioned between the two discs 12. A fourth friction component 36 is carried so as to be anchored on plates 38 which are firmly fixed to the second portion 28 by means of bolts 40, for example, as shown more clearly in FIG. 4.

Figure 2:
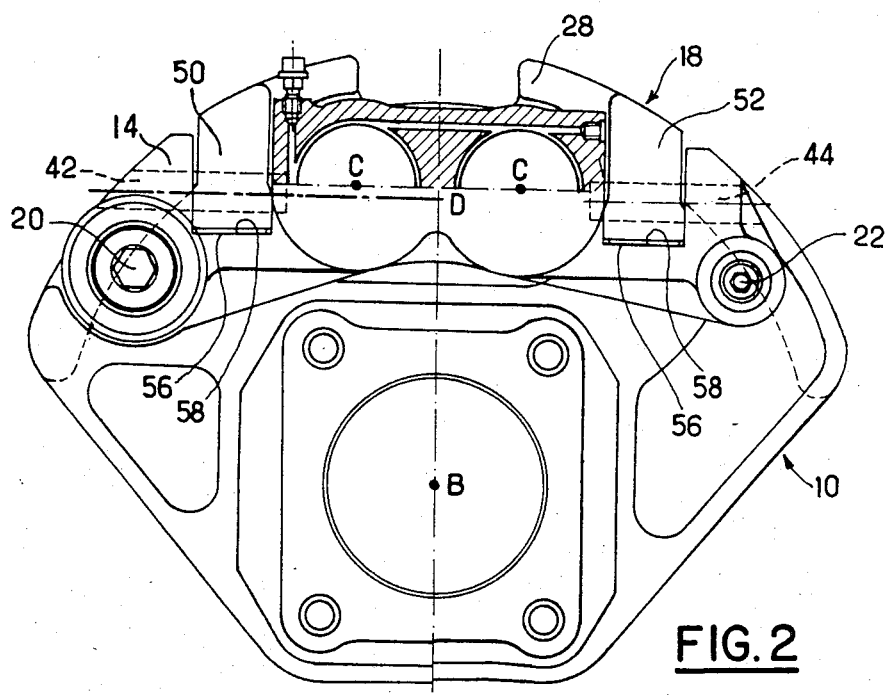
FIG. 2 is an end view of the brake shown in FIG. 1 incorporating portions shown in section.
Figure 3:
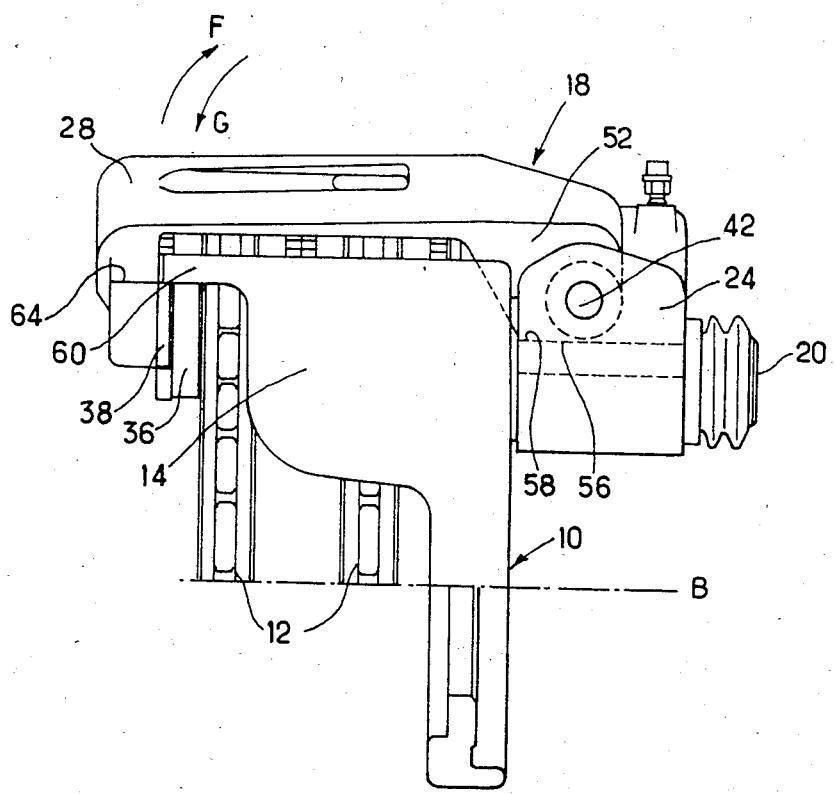
FIG. 3 is a side view in the direction of the arrow A shown in FIG. 1.
Figure 4:
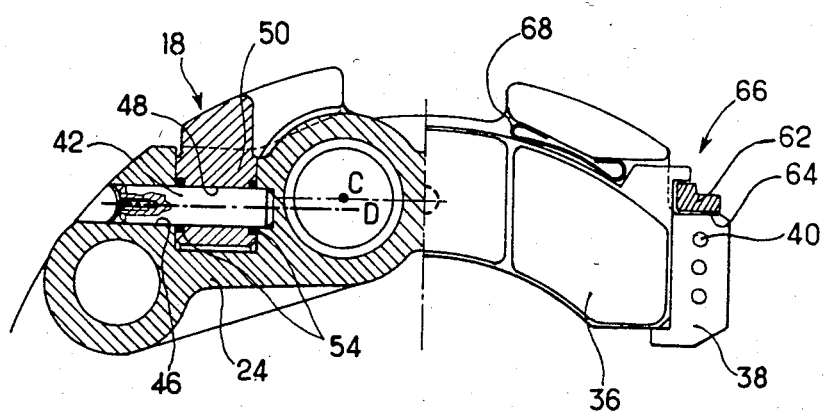
FIG. 4 is a view in partial section through the line IV—IV shown in FIG. 1.

In accordance with the invention, the second portion 28 of the caliper 18 is hinged to the first portion 24 by means of two pins 42 and 44 positioned on each side of the brake actuator, these pins 42 and 44 are mounted in bores 46 formed in the first portion 24 of the caliper 18 and pass through bores 48 formed in arms 50 and 52 of the second portion 28. The bores 48 are able to rotate about the pins 42 and 44 and this rotation is protected from external pollution by means of seals 54 positioned between the first and second portions of the caliper 18. Giving the axis of rotation of the disc 12 the reference B, and giving the line of action of the brake actuator 26 the reference C, this line of action in the embodiment shown being a plane defined by the axes of the bores of the brake actuators, owing to the fact that the brake actuator is of the twin type, it is seen that the axis of articulation of the second portion 28 on the first portion 24, designated by the letter D and formed by the axis of the pins 42 and 44, is nearer to the axis B of rotation of the disc than is the line of action C—C of the brake actuators. The axis D is radially nearer to the axis of rotation of the disc B. Referring to FIGS. 2 and 3, it is seen that the arms 50 and 52 incorporate two flat surfaces 56 which are positioned facing mating surfaces 58 formed on the first portion 24. These surfaces are perpendicular to the plane of the disc 12 and are situated in a zone between the axis of articulation D and the first of the discs 12 situated on the same side as the brake actuator 26. As shown in FIG. 2, the surfaces 56 and 58 lie in a plane perpendicular to the disc 12 and parallel to the axis of articulation D. As shown in FIGS. 1, 3 and 4, the arms 14 and 16 of the fixed support 10 incorporate extensions 60 and 62, which are capable of cooperating with steps 64 formed on the second portion 28, or, when the friction component is new, these extension 60 and 62 are capable of cooperating with the plates 38. These extensions 60 and 62, the steps 64 and the plates 38 form the locking means which is designated in its entirety by the reference 66. A spring 68 is positioned between the friction components and the second portion 28 and pushes the friction components radially inwards and the second portion radially outwards. Referring to FIG. 1, it is seen that the portion 28 incorporates, in the region of the friction component 36, a separating device which is designated by the reference 70 and which consists either of a screw capable of separating axially the friction component 36 from the second portion 28, or of a slot intended to accept the end of a screwdriver or any suitable tool also capable of separating these two components.

Figure 5:
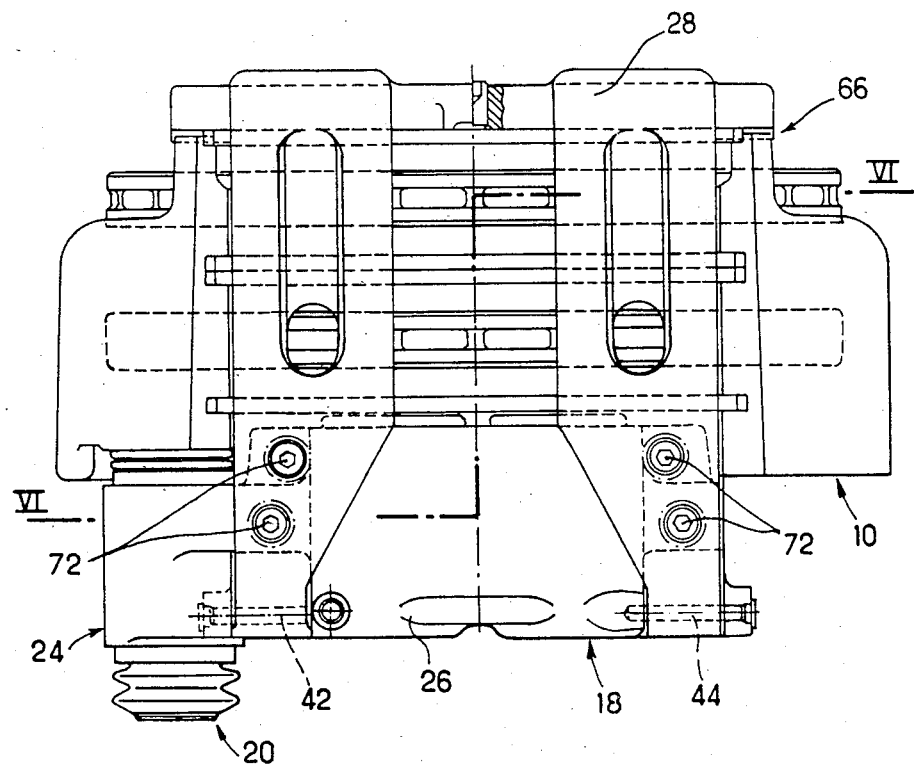
FIG. 5 is a view, similar to that shown in FIG. 1, of a second embodiment.
Figure 6:
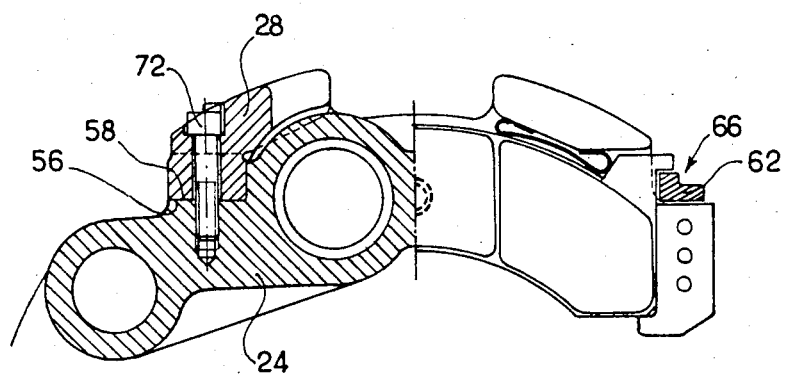
FIG. 6 is a view in partial section along the line VI—VI shown in FIG. 5.

FIGS. 5 and 6 show a second embodiment and the same reference numbers are used for the same components fulfilling the same functions. As for the first embodiment, the brake incorporates a fixed support designated in its entirety by the reference 10 and a sliding caliper designated in its entirety by the reference 18. In this second embodiment, the brake incorporates a single axial pillar 20 only, the rotation of the caliper about this pillar 20 being prevented by the locking means 66 which is identical to that described in the first embodiment. The flat surfaces and the mating surfaces 56 and 58, respectively, are held so as to bear against one another by means of screws 72 cooperating on the one hand with the second portion 28 by means of screw heads and with the first portion 24 by means of a threaded connection. In the same way, in the first emodiment, the first and second portions 24 and 28, respectively, are hinged relative to one another by means of two pins 42 and 44 positioned on each side of the brake actuator 26.

In the two embodiments described above, the mounting of the brake on the vehicle is carried out in such a way that the brakes are in front of the wheel of the vehicle in the direction of forward motion, in such a way that the axis of articulation D is vertical and that the pillar 20 is at a greater height than the axis of the disc 12.

Referring to FIGS. 1 to 4, when it is desired to carry out replacement of the friction components for example, the operation is carried out in the following manner:

With the aid of the separating device 70, bearing against the disc 12, through the friction component 36, the caliper 18 is moved in the direction of the arrow E shown in FIG. 1. This movement makes the locking means 66 inoperative, more precisely, the extensions 60 and 62 of the fixed support no longer cooperate with the steps 64 or the plates 38 of the second portion 28, and the latter can be tilted in the direction of the arrow F shown in FIG. 3 about the pins 42 and 44. This tilting allows access to the friction components 30, 32, 34 and 36 for their replacement. It will be noted that as the axis D defined by the pins 42 and 44 is vertical, the second portion 28 hinges about these pins 42 and 44 in the same way as a door turns about its hinge-pins, and the tilting movement of the second portion 28 is thus independent of the weight of this portion.

In the second embodiment, as shown in FIG. 5, the replacement of the friction components, for example, is carried out in a manner identical to that of the first embodiment. It will be noted, however, that in this embodiment the brake incorporates a single pillar 20 only and that the caliper 18 is capable of turning about the pillar 20 when the locking means 66 are made inoperative. It will be noted, nevertheless, that as the axis of articulation of the second portion 28 is vertical, and the pillar 20 is in the upper portion of the brake, the first portion 24 hangs from the pillar 20 and there is thus no risk of any undesirable movement which could be dangerous.

During the operation of the brake, the hydraulic pistons of the latter act directly upon the friction component 30 which moves the disc which is adjacent to it, and by reaction, through the sliding of this disc, the friction components 32 and 34 are applied against the discs. By reaction through the sliding caliper 18, the second portion 28 acts upon the friction component 36, and the set of four friction components are in frictional engagement with the two discs 12. When the force of the brake actuator 26 increases, the radial offset between the thrust axis C and the axis of articulation D causes tilting of the second portion 28 in the direction of the arrow G shown in FIG. 3. This tilting of the portion 28 would push further the portion of the friction component 36 situated nearest the axis of the disc B if, at the same time, the force transmitted by the brake actuator was not bending this portion 28 which would tend to exert a greater force upon the portion of the friction component 36 nearest the periphery of the disc. Thus it is clear that the greater the force developed by the brake actuator, the greater is the tilting force in the direction of the arrow G, but at the same time, the bending of the portion 28 will be great, and the two phenomena compensate each other.

In order to limit the movements of the portion 28 during braking application, tilting of the latter is limited by abutment means defined by the flat surfaces 56 and the mating surfaces 58 carried respectively by the second and first portions of the caliper.

As far as the second embodiment is concerned, the second portion 28 of the caliper is held so as to bear permanently against the first portion 24 by means of the screws 72, which avoids even slight tilting of the second portion relative to the first, but in this case, the flat surfaces and the mating surfaces are slightly inclined so as to allow the second portion 28 to come first into contact with the friction component 36 in the region of the zone nearest the axis of rotation of the disc, the axial clearance existing between the portion 28 and the friction component 36 in the region of the periphery of the disc being taken up progressively as the bending of this second portion 28 takes place when the force provided by the brake actuator increases. It is clear that, in this embodiment, the screws 72 must be removed for tilting the second portion 28 with the intention of replacing the friction components.

The invention is not limited to the embodiment shown and modifications can be carried out to it without departing from the scope of the present invention; in particular, the brake actuator 26 may be of the single or twin types and may be attached to the first portion 24 and not constructed in a single piece as shown. In the same way, this brake actuator may be operated mechanically and the locking means 66 may be constructed according to embodiments which are known to a person versed in the art.

I claim:

1. Disc brake of the type incorporating a sliding caliper (18) straddling a rotating disc (12) to be braked, the caliper (18) incorporating a first portion (24) sliding on a fixed support (10) by means of at least one axial pillar (20), incorporating a brake actuator (26) capable of acting directly upon a first friction component (30) and, by reaction through the sliding caliper, of acting indirectly upon a second friction component (36) by means of a second portion (28) of the caliper which is astride the disc (12), characterized in that the second portion (28) is hinged to the first portion (24) along an axis of articulation (D) parallel to the plane of the said disc (12) and situated radially nearer the axis (B) of rotation of the disc than a line of action (C—C) of the brake actuator (26) and in that an abutment (56-58) positioned between the first portion (24) and second portion (28) lies in a plane perpendicular to the plane of the disc (12) and parallel to the said axis of articulation (D).

2. Disc brake according to claim 1, characterized in that the axis of articulation (D) is formed on each side of the brake actuator (26) by means of two pins (42-44) each mounted in a bore (46) formed in the first portion (24) and each passing through a bore (48) formed in one of the two arms (50-52) of the second portion (28).

3. Disc brake according to claim 2, characterized in that the abutment (56-58) is formed by two flat surfaces (56) carried by each of the arms (50-52) capable of coming into abutment against two mating surfaces (58) carried by the first portion (24), the surfaces (56-58) lying essentially axially in a zone situated between the axis of articulation (D) and the disc (12).

4. Disc brake according to claim 3, characterized in that the brake incorporates locking means (66) capable of being put out of action during tilting of the second portion (28) relative to the first portion (24) about the axis of articulation (D).

5. Disc brake according to claim 4, characterized in that the locking means (66) are formed by arms (14-16) of the fixed support (10) extending over the disc (12) and capable of cooperating with steps (64) formed in the second portion (28).

6. Disc brake according to claim 4, characterized in that the locking means incorporates screws (72) joining the first portion (24) and the second portion (28) at right angles with the flat surfaces (56-58).

7. Disc brake according to claim 5, characterized in that an anti-squeal spring (68) positioned between the second portion (28) and the friction components (30, 32, 34, 36) holds, when at rest, the flat surfaces (56) separated from the mating surfaces (58).

8. Disc brake according to claim 6, characterized in that the screws hold the flat surfaces (56) so as to bear against the mating surfaces (58).

9. Disc brake according to claim 1, characterized in that the axis of articulation (D) is substantially vertical when the brake is in an operating position.

10. Disc brake according to claim 6, characterized in that an anti-squeal spring (68) positioned between the second portion (28) and the friction components (30, 32, 34, 36) holds, when at rest, the flat surfaces (56) separated from the mating surfaces (58).

* * * * *